US007185334B2

(12) United States Patent
Bourke-Dunphy et al.

(10) Patent No.: US 7,185,334 B2
(45) Date of Patent: Feb. 27, 2007

(54) METHOD AND SOFTWARE TOOL FOR INTELLIGENT OPERATING SYSTEM INSTALLATION

(75) Inventors: Erin M. Bourke-Dunphy, Seattle, WA (US); Paul R. Fitzgerald, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 328 days.

(21) Appl. No.: 09/726,111

(22) Filed: Nov. 29, 2000

(65) Prior Publication Data

US 2004/0015955 A1 Jan. 22, 2004

(51) Int. Cl.
G06F 9/445 (2006.01)
(52) U.S. Cl. .................. 717/174; 717/175; 717/176; 717/177; 717/178
(58) Field of Classification Search ........... 717/174, 717/175, 176, 177, 178
See application file for complete search history.

(56) References Cited

U.S. PATENT DOCUMENTS

| | | | | |
|---|---|---|---|---|
| 5,481,714 A * | 1/1996 | Pipkin et al. ............... | | 717/175 |
| 5,586,304 A | 12/1996 | Stupek et al. | | |
| 5,666,501 A * | 9/1997 | Jones et al. .................. | | 717/177 |
| 5,758,154 A | 5/1998 | Qureshi | | |
| 5,761,380 A | 6/1998 | Lewis et al. | | |
| 5,828,887 A * | 10/1998 | Yeager et al. ............... | | 717/167 |
| 5,950,010 A * | 9/1999 | Hesse et al. ................ | | 717/178 |
| 5,966,540 A * | 10/1999 | Lister et al. ................ | | 717/174 |
| 6,105,069 A * | 8/2000 | Franklin et al. ............ | | 717/174 |
| 6,167,567 A | 12/2000 | Chiles et al. | | |
| 6,182,275 B1 | 1/2001 | Beelitz et al. | | |
| 6,189,138 B1 * | 2/2001 | Fowlow et al. ............. | | 717/107 |
| 6,282,700 B1 | 8/2001 | Grover et al. | | |
| 6,282,711 B1 * | 8/2001 | Halpern et al. ............. | | 717/178 |
| 6,285,932 B1 * | 9/2001 | de Bellefeuille et al. ..... | | 701/33 |
| 6,301,707 B1 * | 10/2001 | Carroll et al. .............. | | 717/177 |
| 6,314,565 B1 * | 11/2001 | Kenner et al. .............. | | 717/174 |
| 6,324,691 B1 * | 11/2001 | Gazdik ....................... | | 717/178 |
| 6,370,686 B1 * | 4/2002 | Delo et al. .................. | | 717/174 |
| 6,374,401 B1 * | 4/2002 | Curtis ......................... | | 717/175 |
| 6,442,754 B1 * | 8/2002 | Curtis ......................... | | 717/175 |

(Continued)

OTHER PUBLICATIONS

Green, "What You Installed Is What You See: Help Navigation in Modular Software Products," Technology & Teamwork, 2000, p. 521-533.

(Continued)

Primary Examiner—Wei Zhen
Assistant Examiner—Qamrun Nahar
(74) Attorney, Agent, or Firm—Amin, Turocy & Calvin, LLP (57) ABSTRACT

A software tool and method are provided for performing a setup operation in a computer system. The software tool comprises a setup component adapted to sense an attribute associated with the computer system and to selectively provide one of standard prompting and special prompting to a user according to the attribute, and a user interface component adapted to render a plurality of setup prompts to a user and to obtain at least one setup parameter. The invention advantageously provides for customized user prompting according to the system attribute whereby one or more prompt screens may be suppressed and default setup parameters used where the attribute indicates that the prompt screens are unnecessary. Moreover, one or more additional prompt screens may be rendered to the user according to the attribute.

39 Claims, 9 Drawing Sheets

U.S. PATENT DOCUMENTS

| | | |
|---|---|---|
| 6,477,703 B1 | 11/2002 | Smith et al. |
| 6,493,871 B1 | 12/2002 | McGuire et al. |
| 6,996,815 B2 | 2/2006 | Bourke-Dunphy et al. |
| 2005/0265247 A1 | 12/2005 | Bourke-Dunphy et al. |

OTHER PUBLICATIONS

Isazadeh, et al., "A Review of Post-Factum Software Integration Methods," External Technical Report, Oct. 1995, p. 1-16.

Szyperski, "Independently Extensible Systems—Software Engineering Potential and Challenges," 19th Australasian Computer Science Conference, Melbourne, Australia, Jan. 31-Feb. 2, 1996.

H. Nakamishi, et al.; "Object-Oriented Data Handling and OODB Operation of LHD Mass Data Acquisition System", Fusion Engineering and Design, 2000, p. 135-142.

P. Loshin; "Netscape's Enterprising Server Upgrade", BYTE (International Edition), May 1997, p. 123, vol. 22, No. 5.

A. Harrington; "State of the Art [Windows 2000]", CA Magazine, May 2000, p. 44-45.

F. Hapgood; "Windows of Opportunity [Web Site Tools]", Inc. Dec. 1999, p. 114, 116, 118, 121, 122, 124, 126, 128, vol. 12, No. 17.

K. Kozel; "Corel's Click & Create: It's All in the Game", Emedia Professional, Jan. 1997, p. 92-96, vol. 10, No. 1.

S. Tezuka, et al,; "PC-LAN Construction Support Tool: Easy Installer", Transactions of the Information Processing Society of Japan, Feb. 1996, p. 300-311, vol. 37, No. 2, abstract only.

K. Fertitta, et al.; "The State of Interchangeability in ATE", IEEE, 2000, p. 417-424.

S. Demetriadis, et al.; "'Graphical'Jogthrough: Expert Based Methodology for User Interface Evaluation, Applied in the Case of an Educational Simulation Interface", ED-MEDIA, 1999, p. 285-299.

\* cited by examiner

METHOD AND SOFTWARE TOOL FOR INTELLIGENT OPERATING SYSTEM INSTALLATION

TECHNICAL FIELD

The present invention relates generally to computer systems, and more particularly to methods and software tools for intelligent software component setup in computer systems.

BACKGROUND

Software applications, operating systems, and/or services are commonly offered to consumers in the form of grouped packages or suites, in which two or more such software components are provided. Such suites are generally provided at a lower cost than the combined cost of the individual applications included therein. In addition, the software suites typically comprise an assortment of related and/or interoperable applications, operating systems, and/or services targeted to satisfy the software needs of a particular type of customer, such as small businesses. Different suites may thus be provided to satisfy various market needs, where certain segments of software consumers commonly require more than one application, operating system, or service. The suite may be provided in the form of a CDROM having the software component files (e.g., application files and/or operating system files) and a setup or installation tool, which the user employs to setup the suite on the user's computer system.

In addition to initial installation, the applications included within any particular suite package, as well as the software operating system (OS) residing in a customer's computer system, may be revised or improved from time to time, in order to provide new and/or improved features, and/or to provide new application components to an installed suite. Consumers typically are provided with such software revisions through upgrade packages. For instance, an upgrade may replace an existing software application with a newer version or revision. This may be sold to the customer in the form of a CDROM having the new application files and a setup or installation tool, which the user employs to remove the old revision and install the new one. Upgrades are usually sold for major revisions of a software application or service.

The software suite offerings may be employed in single machines, as well as in networks of computers. Some such software suites are created specifically for small business settings, in which the target purchaser has only a small number of computers networked together (e.g., less than 50). Other suites are designed to accommodate much larger network organizations, and thus provide a range of features beyond those provided in small business type software suites. For example, a small business suite may include a fixed, maximum number of client access licenses (CALs) at a fixed cost, whereas large business software suites may offer the user options to customize their license purchases.

While various software suites may be designed for different target consumer groups with differing needs, certain components (e.g., operating system and/or application components) may be common to two or more such suites. This allows the software vendors to use the same components in a variety of suites, providing economic as well as logistical advantages. For instance, an operating system component may be adapted to operate in small business software suites as well as those designed for large businesses, thus reducing the vendor costs associated with developing and supporting two different operating systems.

Because some suites cost more than others, unscrupulous users may be inclined to purchase lower cost software suites (e.g., those targeted toward small business applications) and to install one or more components thereof in system configurations for which they were not intended (e.g., in a large organization), rather than purchasing the higher cost suite package, and the licenses associated therewith. Thus, there is a need to limit the functionality of software components in lower cost suites to prevent such unintended usage and to allow proper enforcement of software licenses, particularly where the lower cost and higher cost suites include common components.

Moreover, where a common component is used in two different suites, there may be one or more setup parameters for which a user must make a decision in one such suite, whereas no decision is needed for the same component in a second suite. Thus, there is a need for setup and/or installation tools, which provide for logical, high quality setup prompting where a common component is included in two suites having different cost targets and/or functional capabilities.

SUMMARY

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later. The invention comprises a software tool and methodology, which address the above-mentioned problems associated with performing setup operations with respect to software components in a computer system. For example, the invention provides tools and methods which may be employed to prevent unscrupulous persons from employing one or more components from a low cost software suite in systems for which they were not intended, as well as to provide for proper licensing and logical setup experiences for legitimate users.

A software setup tool and methodology are provided for performing a setup operation in a computer system. The setup operation may comprise, for example, installing an operating system, application, and/or other software component onto the system. The software tool queries or senses the value of a registry key or other system attribute and selectively modifies or customizes the installation according to the sensed attribute. For example, a registry key may be sensed in the computer system registry (e.g., via a direct query or by using an application program interface (API)). Based on the value of the registry key, one or more setup screens or prompts may be selectively rendered or suppressed from being rendered to the user via an interface. Alternatively or in combination, one or more additional prompts may be provided to the user according to the attribute. In addition, the software tool may selectively prompt a user for a setup related choice, or use an unprompted default setup parameter associated with one or more setup options according to the sensed attribute.

For instance, where a setup screen is adapted to prompt the user for a first or second choice, and the registry key value indicates that the second choice is invalid for the computer system, the setup screen may be unnecessary. In this case, the software tool may selectively use the first choice in installing or setting up the operating system, and may further selectively suppress the rendering of the setup screen to the user. In this fashion, the user is presented with a logical setup prompt flow tailored to the specific system in which the setup is occurring. Thus, where an operating system or other program is being installed in a system having an application suite which renders one or more of the operating system setup choices inapplicable or otherwise unnecessary, the software tool may easily sense an attribute, such as a registry key, indicating the installed application suite, and customize the operating system installation prompting accordingly.

In addition to selective prompting, the invention provides for tailoring of the setup according to the sensed attribute. For example, where a component (e.g., an operating system) is common to both a low cost suite package and a higher cost suite package, the attribute may be used to selectively limit the functionality of the component in the lower cost suite. This may be advantageous to prevent unscrupulous purchasers of the lower cost suite from installing the component in a system other than that for which the suite was designed or intended. The invention may thus be employed in order to properly enforce licensing, for example, by limiting the number of client connections in a small business suite setup of an operating system component.

In accordance with one aspect of the invention, there is provided a software tool for installing one or more software components on a computer system, comprising a user interface component and a setup component. The user interface component is adapted to render one or more setup prompts to a user and to obtain a user command. For example, the user may be prompted to provide setup selections or other setup parameters. The setup component is adapted to selectively install the software component or components on the computer system according to the setup parameters, to sense an attribute associated with the computer system and to selectively provide setup prompting to the user interface component according to the attribute. The sensed attribute may comprise any attribute associated with the target computer system, for example, a key or entry in the system registry or other data store.

The setup prompting may thus be customized for the particular computer system according to the sensed attribute, whereby one or more setup prompts may be suppressed from the user interface component, and/or one or more additional prompts may be provided. For example, where a setup prompt comprises a selection between two or more setup parameters, and only one of the possible selections is applicable to the system (as indicated by the attribute), the setup component may select the applicable setup parameter according to the attribute, and bypass rendering the setup prompt to the user. One or more software components (e.g., applications and/or operating systems) may then be installed and/or upgraded using the selected setup parameter without prompting the user to make unnecessary and/or confusing selections. In this way, one or more software components may be selectively installed and/or configured according to the attribute, which may indicate, for example, that the user has only purchased a low cost software suite, or otherwise has purchased only a limited number of licenses.

According to another aspect of the invention, there is provided a software setup tool for performing a setup operation in a computer system, comprising a setup component adapted to sense an attribute associated with the computer system (e.g., a registry key) and to selectively provide one of standard prompting and special prompting to a user according to the attribute. The setup tool further comprises a user interface component adapted to render a plurality of setup prompts to a user and to obtain one or more setup parameters. The tool may also perform one or more setup operations according to the setup parameters and the attribute.

The setup component may selectively suppress at least one setup prompt from the user interface component if the attribute indicates the prompt is unnecessary. In addition, where an unnecessary setup prompt includes a selection between at least two setup parameters, the setup component may advantageously select one of the setup parameters according to the attribute. The tool may also provide one or more additional setup prompts to the user according to the attribute. Moreover, the setup component may advantageously tailor the setup of one or ore software components (e.g., installation, upgrade, and the like) according to the attribute. Thus, the invention prevents unauthorized or unintended use of a low cost software suite component, and provides for enforcement of licenses.

According to yet another aspect of the invention, there is provided a method of performing a setup operation in a computer system, which comprises sensing an attribute associated with the computer system (e.g., a registry key), and selectively providing standard or special prompting to a user in association with the setup operation according to the attribute. The prompting may include rendering a plurality of setup prompts to a user, and obtaining one or more setup parameters, for example, via a user interface, whereafter one or more setup operations may be selectively performed according to the setup parameters.

Special prompting may be provided, for example, where the tool senses that a particular suite of software components is installed on the system. This customized or special prompting may comprise suppressing one or more one setup prompts from the user interface component (e.g., where the attribute indicates the prompt is unnecessary) and/or rendering one or more additional setup prompts to the user interface. Special prompting in this regard, may further comprise rendering one or more alternative or substitute prompts to the user in lieu or one or more standard prompts, according to the attribute.

Another aspect of the invention provides a computer-readable medium comprising computer-executable instructions for sensing an attribute associated with the computer system, and selectively providing one of standard prompting and special prompting to a user in association with the setup operation according to the attribute. Still another aspect of the invention provides a data packet adapted to be transmitted between at least two processes, comprising a setup component adapted to sense an attribute associated with the computer system and to selectively provide one of standard prompting and special prompting to a user according to the attribute, and a user interface component adapted to render a plurality of setup prompts to a user and to obtain at least one setup parameter.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

DETAILED DESCRIPTION

The present invention is now described with reference to the drawings, wherein like reference numerals are used to refer to like elements throughout. In the following description, for purposes of explanation, numerous specific details are set forth in order to provide a thorough understanding of the present invention. It may be evident, however, to one skilled in the art that the present invention may be practiced without these specific details. Moreover, well-known structures and devices are illustrated in some instances in block diagram form in order to facilitate description of the present invention.

Referring now to the drawings, the present invention comprises a software tool and methodology whereby the functionality of a software component may be selectively limited in lower cost suites to prevent unintended usage and to allow proper enforcement of software licenses, particularly where the lower cost and higher cost suites include common components. The invention further provides for logical, high quality setup prompting where a common component is included in two suites having different cost targets and/or functional capabilities.

Figure 1:
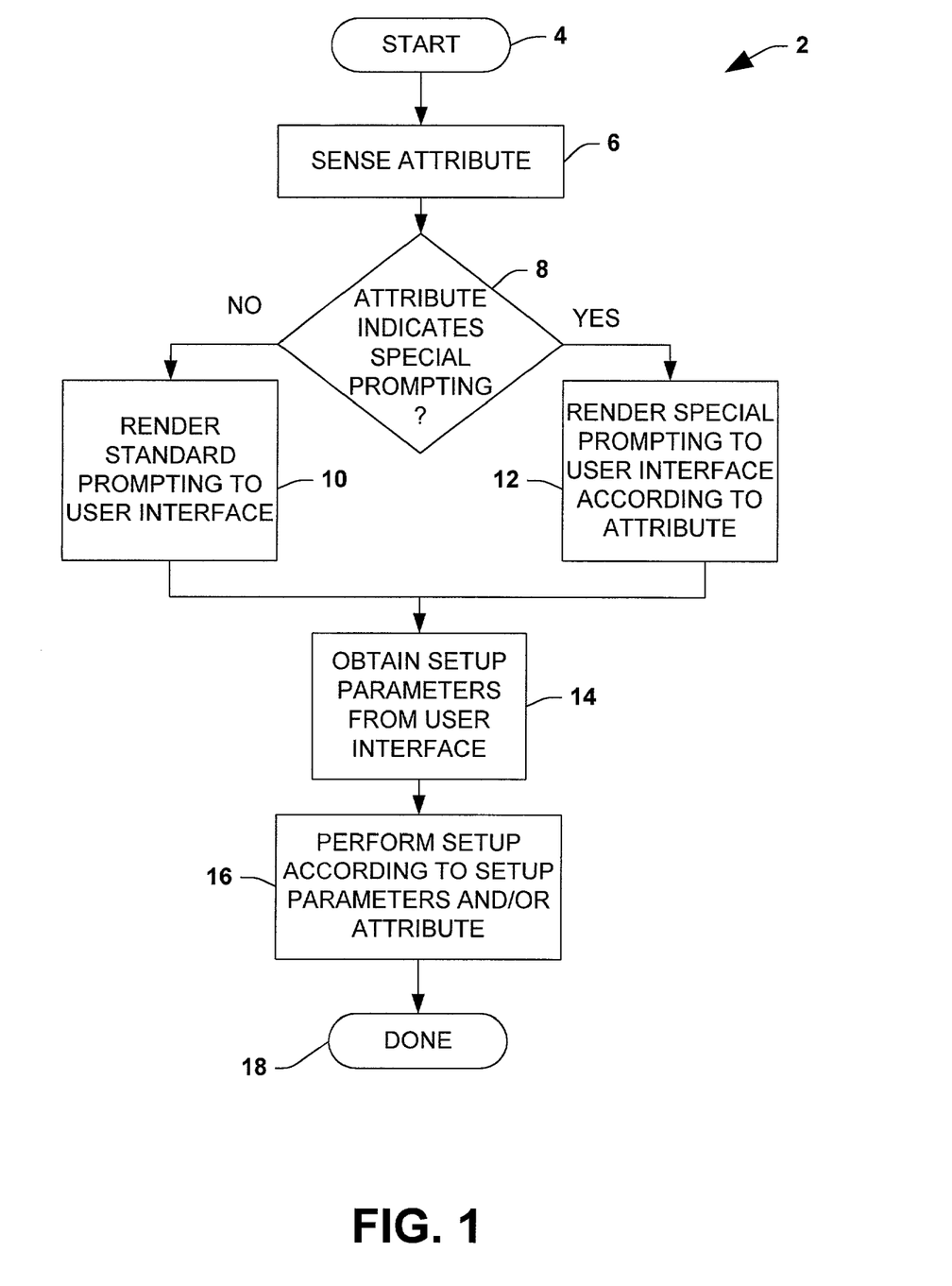
FIG. 1 is a flow diagram illustrating an exemplary method of performing a setup operation in a computer system in accordance with an aspect of the present invention.

In FIG. 1, an exemplary method 2 is illustrated for performing one or more setup operations in a computer system. Although the method of FIG. 1 is illustrated and described as a series of steps, it is to be understood and appreciated that the present invention is not limited by the order of steps, as some steps may, in accordance with the present invention, occur in different orders and/or concurrently with other steps from that shown and described herein. Moreover, not all illustrated steps may be required to implement a methodology in accordance with one or more aspects of the present invention.

The method 2 comprises sensing an attribute associated with the computer system, and selectively providing one of standard prompting and special prompting to a user in association with the setup operation according to an attribute, such as a registry key. Method 2 further selectively performs at least one setup operation according to one or more setup parameters and the attribute. In this way, one or more software components may be selectively installed and/or configured according to the attribute, which may indicate, for example, that the user has only purchased a low cost software suite, or otherwise has purchased only a limited number of licenses.

The method 2 may be employed, for example, by a software setup tool for installing and/or upgrading an operating system or other type software component. Beginning at step 4, an attribute (e.g., a key or other entry in a computer system data store such as a registry) is sensed at step 6. For example, where the attribute is a registry key (not shown), the registry may be queried directly by the setup software tool, or the value of the key may be obtained via an API (not shown).

At step 8, a determination is made as to whether the attribute indicates that special prompting is appropriate. For example, the attribute may indicate that a software suite designed for small businesses is installed in the system. In this situation, there may be limitations placed on the functionality or licensing of one or more components of the installed suite (e.g., applications or operating system). Where the component currently being installed or upgraded by the setup operation is common to other (e.g., more costly) suites, the standard setup prompting for the component may include questions or prompts relating to functions not available in the installed suite. The invention prevents a user from accessing these functions by providing special or selective prompting according to the sensed attribute, as described in greater detail hereinafter.

If special prompting is not required at step 8, the standard prompting (e.g., the normal prompting associated with the setup operation) is rendered to a user interface at step 10. Otherwise, the invention renders special prompting to the interface at step 12. As illustrated and described in greater detail hereinafter, special prompting may comprise suppressing one or more prompts from the user, rendering one or more additional prompts to the user, and/or selectively substituting one or more special prompts in place of or in lieu of one or more standard prompts. In this fashion, the setup experience is tailored to the system in which the setup is taking place by the advantageous sensing of the attribute associated therewith.

Thereafter, one or more setup parameters are obtained from the user interface at step 14, which are then used in performing one or more setup operations (e.g., installation and/or upgrading of one or more software components) at step 16, after which the method 2 ends at step 18. The setup operations at step 16 may further be performed according to the attribute sensed at step 6. For example, one or more setup parameters may be determined solely according to the attribute, such as where the installation of a small business oriented software suite indicates that an operating system must be installed in per server licensing mode, or that the operating system component must be installed in the root directory as the root domain controller.

Thus, where prompting of these setup parameters or selections (e.g., per server licensing mode vs. per seat licensing mode, installation directory, and the like) is unnecessary, the setup tool may advantageously use appropriate default settings determined according to the attribute. It will be noted that this methodology 2 prevents the user from obtaining functionality or licenses where these have not been properly paid for, as well as provides for logical prompting without unnecessary prompts to choose from two or more selections where only one selection is possible or appropriate.

Figure 2:
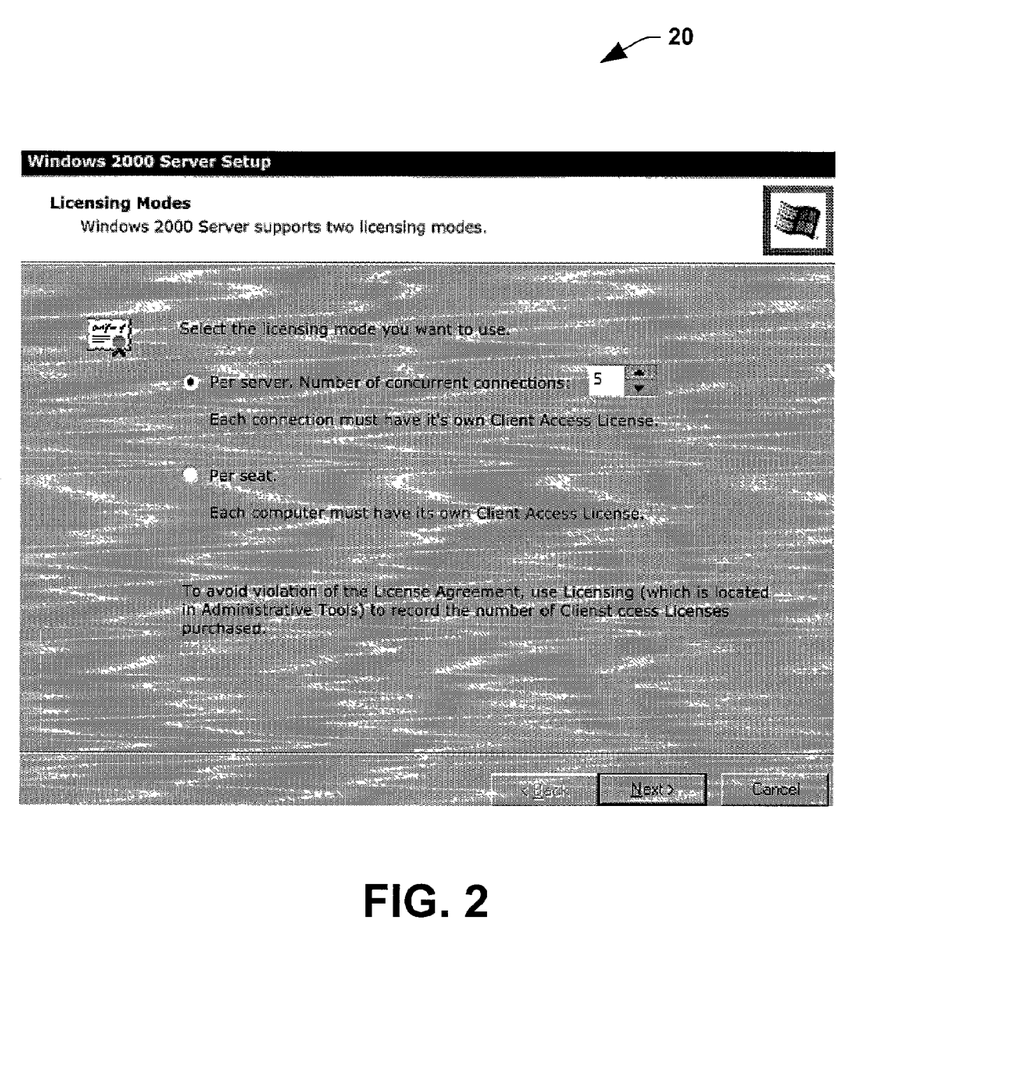
FIG. 2 is a front elevation view of an exemplary user interface setup prompt which may be selectively suppressed in accordance with the invention.
Figure 3:
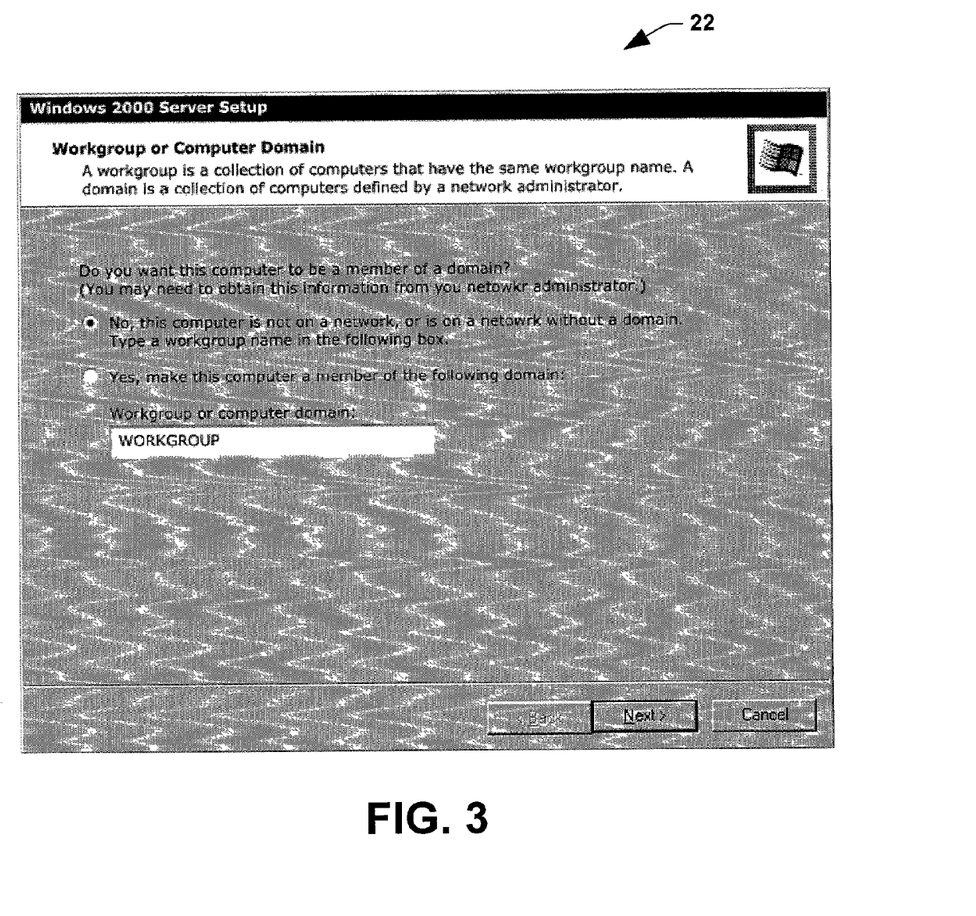
FIG. 3 is a front elevation view of another exemplary user interface setup prompt which may be selectively suppressed in accordance with the invention.

In order to further illustrate the concept of selective prompting, FIGS. 2 and 3 illustrate two exemplary user prompts which may be selectively suppressed in accordance with an aspect of the present invention. The prompt 20 of FIG. 2 includes a licensing modes setup screen, which allows a user to select one of 'per server' licensing mode and 'per seat' licensing mode. The licensing mode selection via the prompt 20 may be employed as part of an operating system setup operation. However, depending on an attribute associated with the system in which the setup is taking place, this licensing mode selection may be inapplicable or unnecessary.

For example, a software suite (e.g., targeted toward small business organizations) may be installed on the system which permits only 'per server' licensing mode. An attribute (e.g., a registry key) associated with the system may indicate the existence of such a suite. Where a user knows of this requirement, the rendering of the prompt 20 may lead to user confusion, or an attempt to select 'per seat' licensing mode. Accordingly, the invention provides for suppressing the prompt screen 20 during setup, and the use of 'per server' licensing mode as a default setup parameter. In addition, the setup may provide an indication to the user that 'per server' licensing mode is being employed, for example, by rendering a substitute prompt (not shown) to the user.

Another example is illustrated in FIG. 3, where a setup prompt 22 provides a selection of whether or not to configure the target computer system as a member in a domain. This prompt may be selectively employed, for example, as part of an operating system setup operation. In a situation where an installed software suite (e.g., such as a suite targeted for small business organizations) requires the system to be configured as a root domain controller, the invention may provide for suppressing the rendering of the prompt 22, and defaulting the setup operation to configure the system as the root domain controller in a workgroup entitled 'workgroup'. In this situation, the existence of the installed software suite may be determined by consulting a system attribute, such as a registry key. Thus, the user is not forced to ponder over potentially ambiguous information, and the setup experience is tailored to the system requirements.

Figure 4:
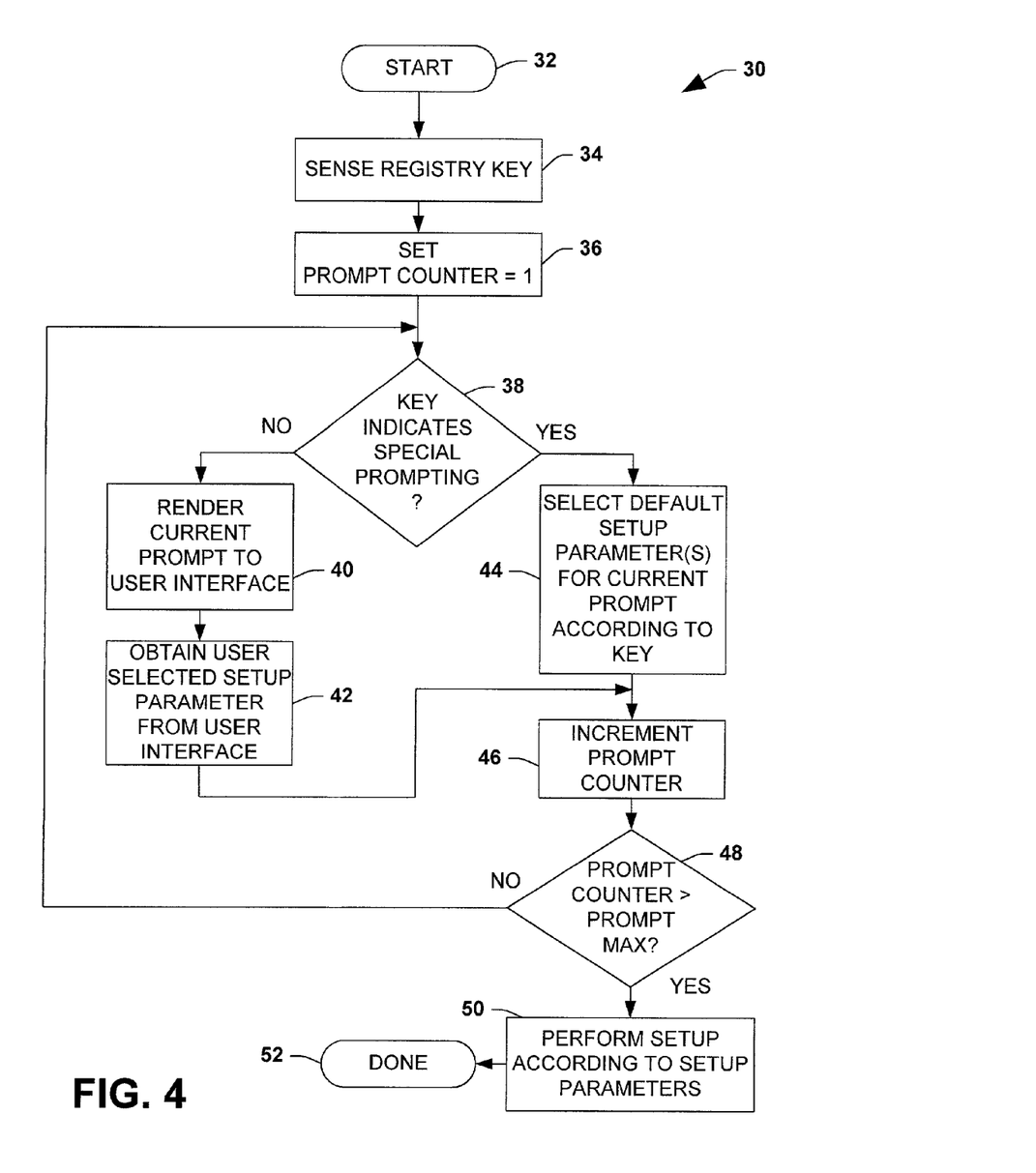
FIG. 4 is a flow diagram illustrating another exemplary method of performing a setup operation in accordance with the invention.

As a further illustration of various aspects of the invention, another exemplary method 30 is illustrated in FIG. 4 for performing setup operations in a computer system. Although the method 30 is illustrated in FIG. 4 and described herein as a series of steps, the present invention is not limited by the illustrated ordering of steps. Thus, in accordance with the invention, some steps may occur in different orders and/or concurrently with other steps from that shown and described herein. Moreover, not all illustrated steps may be required to implement a methodology in accordance with the invention.

Beginning at step 32, a registry key is sensed at step 34, after which a prompt counter is set to 1 at step 36. Thereafter at decision step 38, a determination is made as to whether the sensed registry key indicates special prompting is required or otherwise appropriate. If not, the current (e.g., standard) prompt associated with the setup operation is rendered to a user interface at step 40 and one or more user selected setup parameters are obtained from the user interface at step 42. If special prompting is indicated by the attribute at step 38, one or more default parameters may be selected by the setup tool (e.g., where the attribute indicates that no user selections are appropriate for the installed suite) at step 44. In this case, the tool may forgo or otherwise suppress rendering a prompt to the user.

It will be noted that alternative to, or in combination with the selective suppression of prompting, the invention further comprises rendering one or more additional prompts as appropriate according to the attribute. In addition, the invention contemplates selectively substituting one or more special prompts for one or more standard prompts associated with a setup operation. For example, a standard prompt may allow a user to select one of three possible values for a setup parameter. Where the attribute renders only two of these three values applicable or otherwise appropriate to the system, a substitute prompt may be rendered to the user (e.g., in lieu of the standard prompt), which comprises only the two applicable setup parameter values.

In this fashion, the user is not forced to ponder over a known inappropriate choice, and/or is spared the need to be notified (e.g., via a further error prompt) that an erroneous selection has been made and to have to re-enter another selection. Thus, the invention provides for logical, consistent, and intelligent user prompting in association with the setup of a software component that may be common to various situations (e.g., part of different software suites). Moreover, the invention may be employed to prevent the user from enabling certain functionality associated with a component being setup, where the user has not properly paid for such functionality (e.g., the attribute indicates that only a fixed number of clients may be supported). It will be further recognized that the invention is applicable in association with many forms of user prompts, including but not limited to visual prompt screens, audio prompts, and the like.

Once standard prompting has been performed via steps 40 and 42 or one or more default setup parameters are selected (e.g., in lieu of such prompting) at step 44, the method 30 proceeds to step 46 where the prompt counter is incremented. The prompt counter is then compared with a maximum (e.g., determined according to the number of standard prompts associated with a setup operation) at decision step 48. If the maximum has not yet been exceeded at step 48, the method 30 returns to step 38 for processing of further prompting as described above. Once the maximum number of prompts have been thus processed, the setup is performed at step 50 according to the setup parameters (e.g., one or more of which may have been determined or otherwise selected according to the attribute or registry key), and the method 30 ends at step 52.

Figure 5:
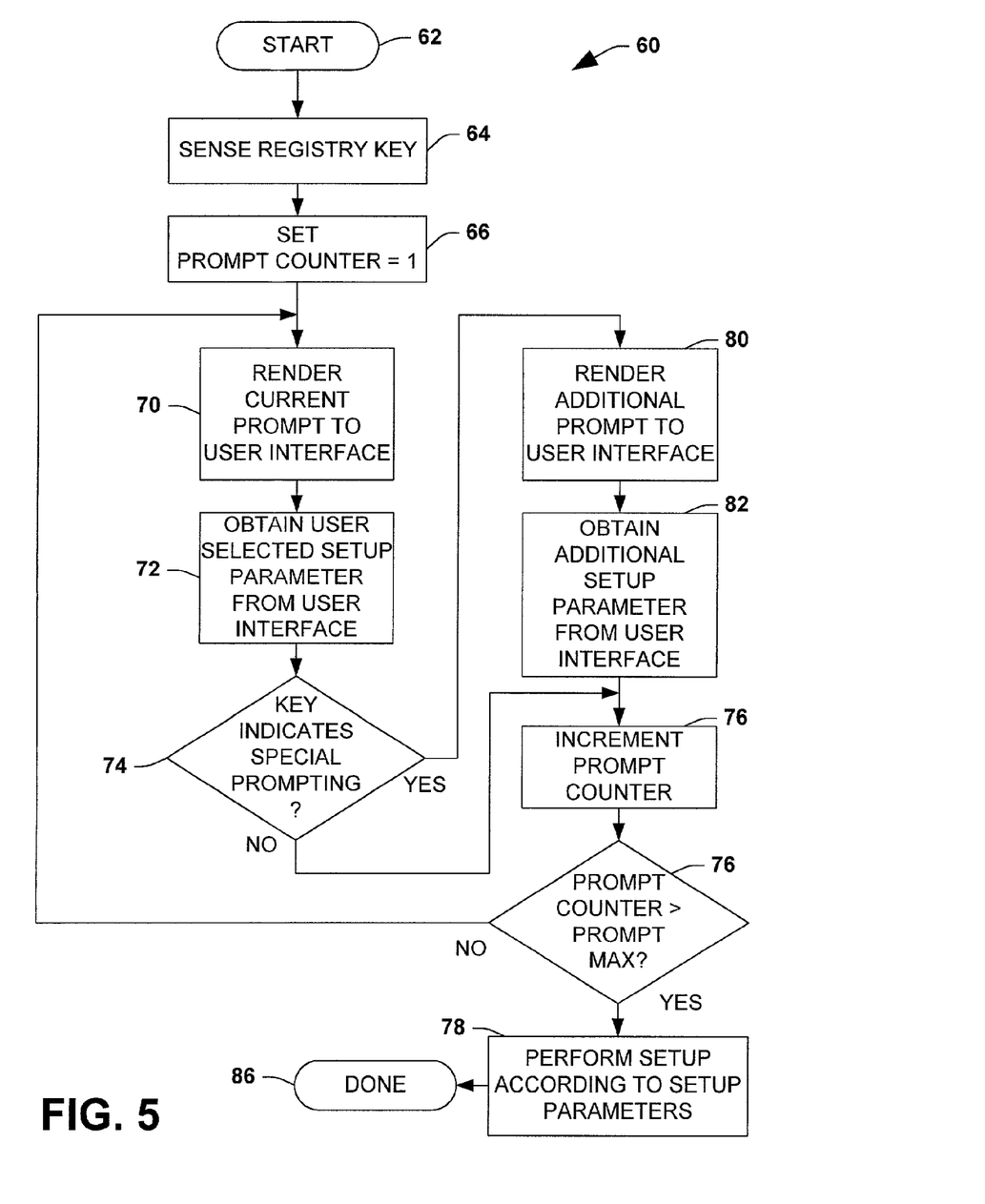
FIG. 5 is a flow diagram illustrating another exemplary method of performing a setup operation in accordance with the invention.

In accordance with another aspect of the invention, FIG. 5 illustrates another exemplary method 60 for performing a setup operation in a computer system, which begins at step 62. Although the method 60 is illustrated in FIG. 5 and described herein as a series of steps, the present invention is not limited by the illustrated ordering of steps. Thus, in accordance with the invention, some steps of the method 60 may occur in different orders and/or concurrently with other steps from that shown and described herein. Moreover, not all illustrated steps may be required to implement a methodology in accordance with the invention.

A registry key is sensed (e.g., via direct query or API) at step 64, and a prompt counter is set initialized to 1 at step 66. At step 70, the current prompt is rendered to a user interface, after which one or more user selected parameters or parameter values are obtained from the user interface at step 72. At decision step 74, a determination is made as to whether or not the registry key indicates that special prompting is required or appropriate. If not, the prompt counter is incremented at step 76 and compared with a prompt maximum value at step 78.

If, however, the registry key indicates special prompting at step 74, the method 60 proceeds to step 80 where one or more additional prompts may be rendered to the user interface, and one or more additional setup parameters may be obtained therefrom at step 82. The invention thus provides for selectively suppressing at least one setup prompt from the user interface component if the attribute indicates the at least one setup prompt is unnecessary, and/or rendering at least one additional setup prompt to the user interface according to the attribute (e.g., the sensed registry key).

The method 60 proceeds in this fashion until the maximum prompt value has been exceeded at step 78, whereafter one or more setup operations (e.g., installing and/or upgrading one or more software components in a computer system) are performed at step 84. The setup may thus be performed at step 84 according to the setup parameters (e.g., one or more of which may have been determined or otherwise selected according to the attribute or registry key), after which the method 60 ends at step 86.

Although the methods 30 and 60 of FIGS. 4 and 5, respectively, have been illustrated as providing for selectively suppressing at least one setup prompt from the user interface component and/or rendering at least one additional setup prompt to the user interface according to the attribute (e.g., the sensed registry key), the invention is not limited to the illustrated methodologies. For example, the invention may further comprise (e.g., alternatively or in combination therewith) rendering at least one substitute setup prompt to the user interface (e.g., in lieu of one or more standard prompts) according to the attribute.

Figure 6:
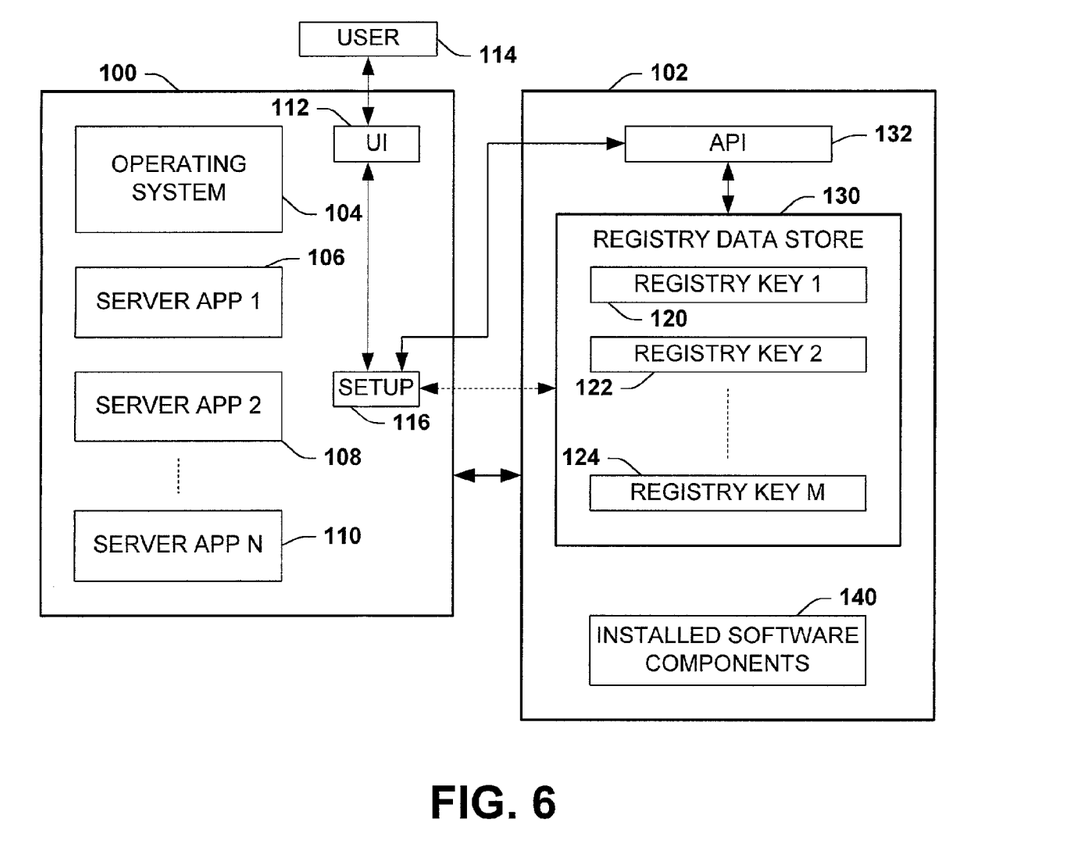
FIG. 6 is a schematic diagram illustrating an exemplary software setup tool according to another aspect of the invention.

Referring now to FIG. 6, an exemplary software tool 100 is illustrated for performing a setup operation. The setup operation may comprise, for example, installing and/or upgrading one or more software components on a computer system 102. The software components may include any type thereof, such as an operating system 104, and/or one or more applications such as server application number 1 106, server application number 2 108, and server application number N 110, where N is an integer. The software components may, but need not be, part of the tool 100. The setup tool 100 comprises a user interface component 112 adapted to render a plurality of setup prompts (not shown) to a user 114 and to obtain one or more user commands or selections therefrom.

In addition, the tool 100 comprises a setup component 116 adapted to selectively install and/or upgrade one or more software components (e.g., components 104, 106, 108, and/or 110) on the computer system 102 according to the user command. Setup component 116 may further be adapted to sense an attribute such as one or more registry keys 120, 122, and/or 124 associated with the computer system 102. For example, the registry keys 120, 122, and 124 may be included in a data store such as a registry 130. In this regard, the setup component 116 of the setup tool 100 may sense or otherwise obtain the registry key (e.g., key 120) or a value associated therewith via direct query to the registry 130 or via an API 132.

It will be further noted that one or more of the registry keys 120, 122, and/or 124 may include information related to software components 140 installed on the system 102. For example, the registry key 120 may indicate that a software suite has been previously installed on the computer system 102, which is designed for use by small businesses. The setup tool 100 thus may advantageously provide targeted prompting according to the key 120, whereby standard prompts associated with a software component being installed or upgraded (e.g., components 104, 106, 108 and/or 110) may be selectively suppressed, additional prompts may be provided, and/or substitute prompts may be rendered in lieu of one or more standard prompts, in accordance with the invention.

This avoids unnecessary prompting, and provides for limiting the functionality associated with one or more of the installed or upgraded components. For example, the tool 100 may use default values in lieu of obtaining elections from the user 114 where the registry key 120 indicates that no selection is needed or appropriate for a particular setup parameter.

Figure 7:
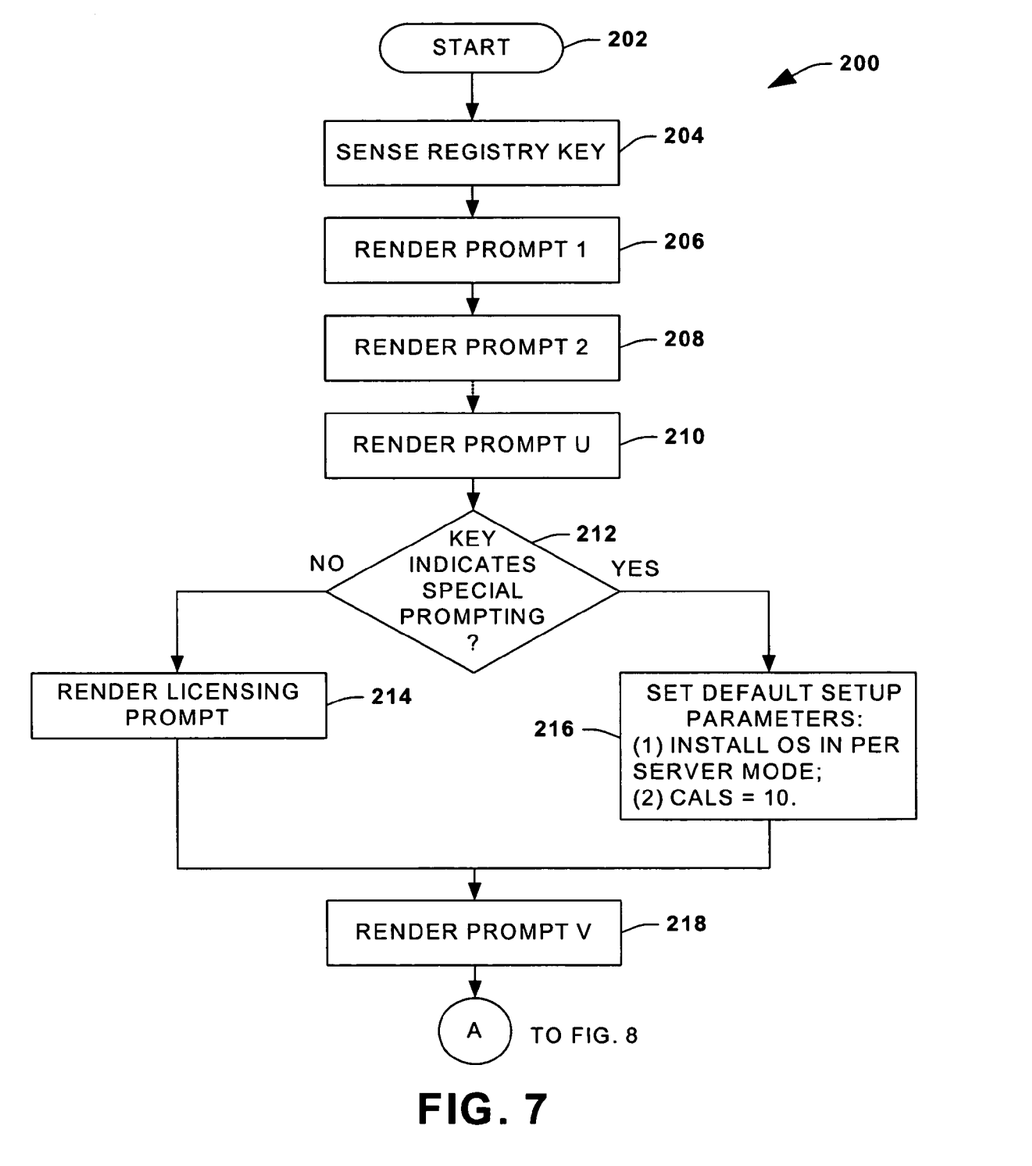
FIG. 7 is a flow diagram illustrating another exemplary method of performing a setup operation in a computer system according to the invention.
Figure 8:
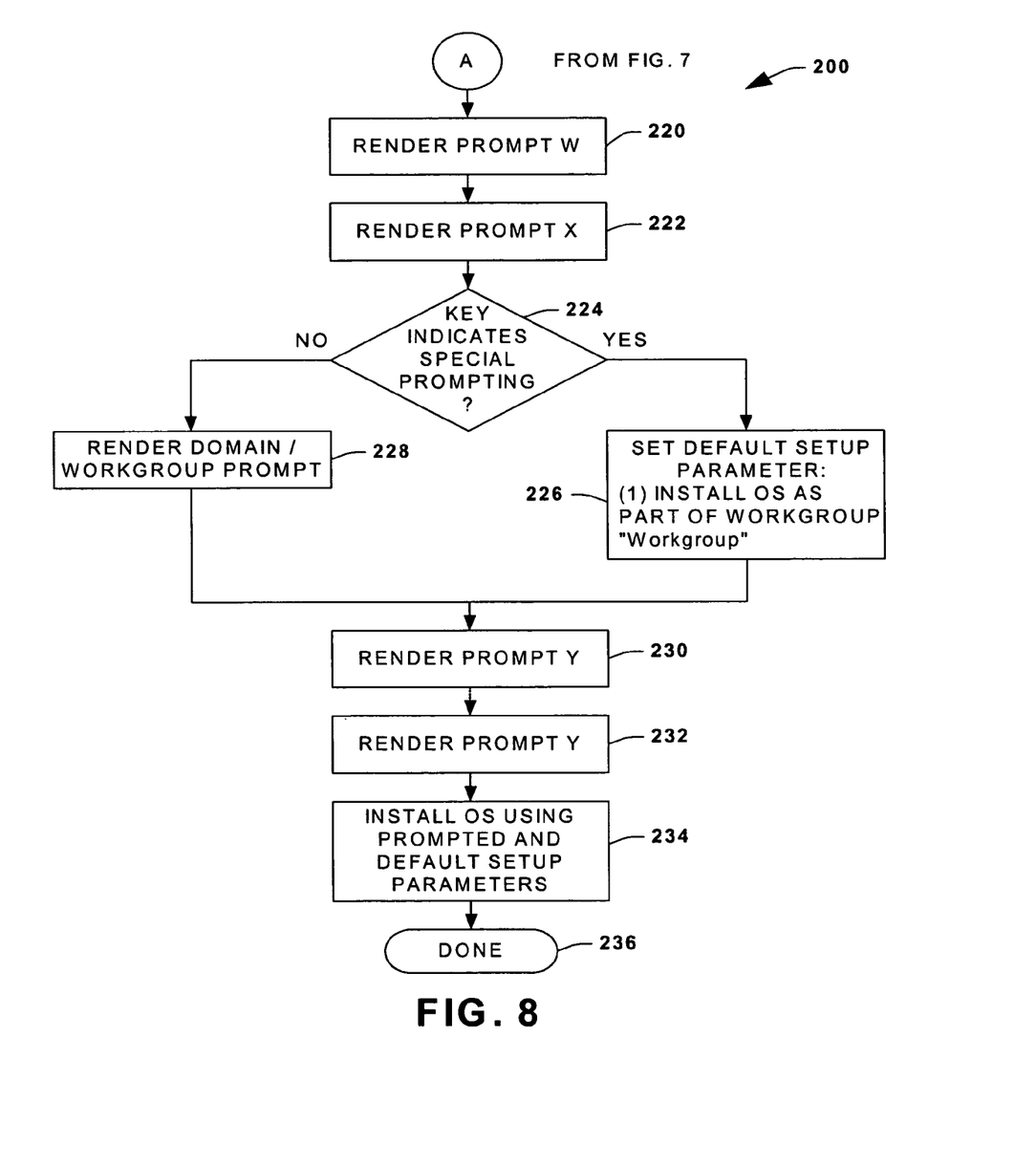
FIG. 8 is a flow diagram further illustrating the method of FIG. 7.

FIGS. 7 and 8 illustrate another exemplary method 200 of performing a setup operation (e.g., installing or upgrading a software component) in a computer system (e.g., system 102 of FIG. 6). Although the method 200 is illustrated in FIGS. 7 and 8 and described herein as a series of steps, the present invention is not limited by the illustrated ordering of steps. Thus, in accordance with the invention, some steps may occur in different orders and/or concurrently with other steps from that shown and described herein. Moreover, not all illustrated steps may be required to implement a methodology in accordance with the invention. Beginning at step 202, a registry key (or other attribute associated with the computer system) is sensed at step 204 (e.g., via direct querying of a registry or other data store or via an API). Thereafter, one or more standard prompts may be rendered to a user (e.g., via a user interface) at steps 206, 208, and 210.

At decision step 212, a determination is made as to whether the registry key sensed at step 204 indicates or otherwise calls for special prompting to be employed in the setup operation. For example, the registry key (e.g., key 120 of FIG. 6) may indicate that a small business suite is installed in the system (e.g., components 140 of system 102). This suite may require that an operating system component being setup (e.g., installed and/or upgraded) should be installed in a per server licensing mode, with a fixed number of client access licenses (CALs) of ten. Proceeding with this example, if no special prompting is indicated by the sensed key, the method 200 proceeds to step 214, where a licensing prompt is rendered to the user (e.g., to ascertain how many licenses the user desires, and whether the licensing should be done on a per seat basis or on a per server basis).

However, if the small business suite is installed in the system, or the sensed key otherwise indicates that special prompting is appropriate, the method 200 proceeds to step 216, whereby the licensing prompt is bypassed or suppressed, and default values are used for the setup parameters associated with the licensing mode and the number of licenses. Thus, in this example, the setup tool may default these parameters to installation of the operating system in per server license mode, with 10 licenses.

Thereafter, one or more further standard prompts may be rendered to the user at steps 218, 220, and 222. At decision step 224, a determination is made as to whether special prompting is again required or appropriate. For example, the key sensed at step 204 may indicate that the small business software suite installed on the target system requires that the operating system be installed as the root domain controller (e.g., where the small business suite is not designed to support multiple domains or workgroups). In this case, rather than allowing the user to incorrectly or erroneously select to install (or upgrade) the operating system software component as other than the root domain controller, the method 200 may selectively set a default setup parameter such that the OS is installed as part of a workgroup named "Workgroup" to ensure that the installed or upgraded OS is the root domain controller, and may further bypass or suppress rendering a domain/workgroup prompt which would have otherwise been performed at step 228.

Thereafter, the method 200 proceeds through steps 230 and 232, where further (standard) user prompting is performed. The operating system may then be installed at step 234 using prompted parameters and default setup parameters, after which the method 200 ends at step 236.

Figure 9:
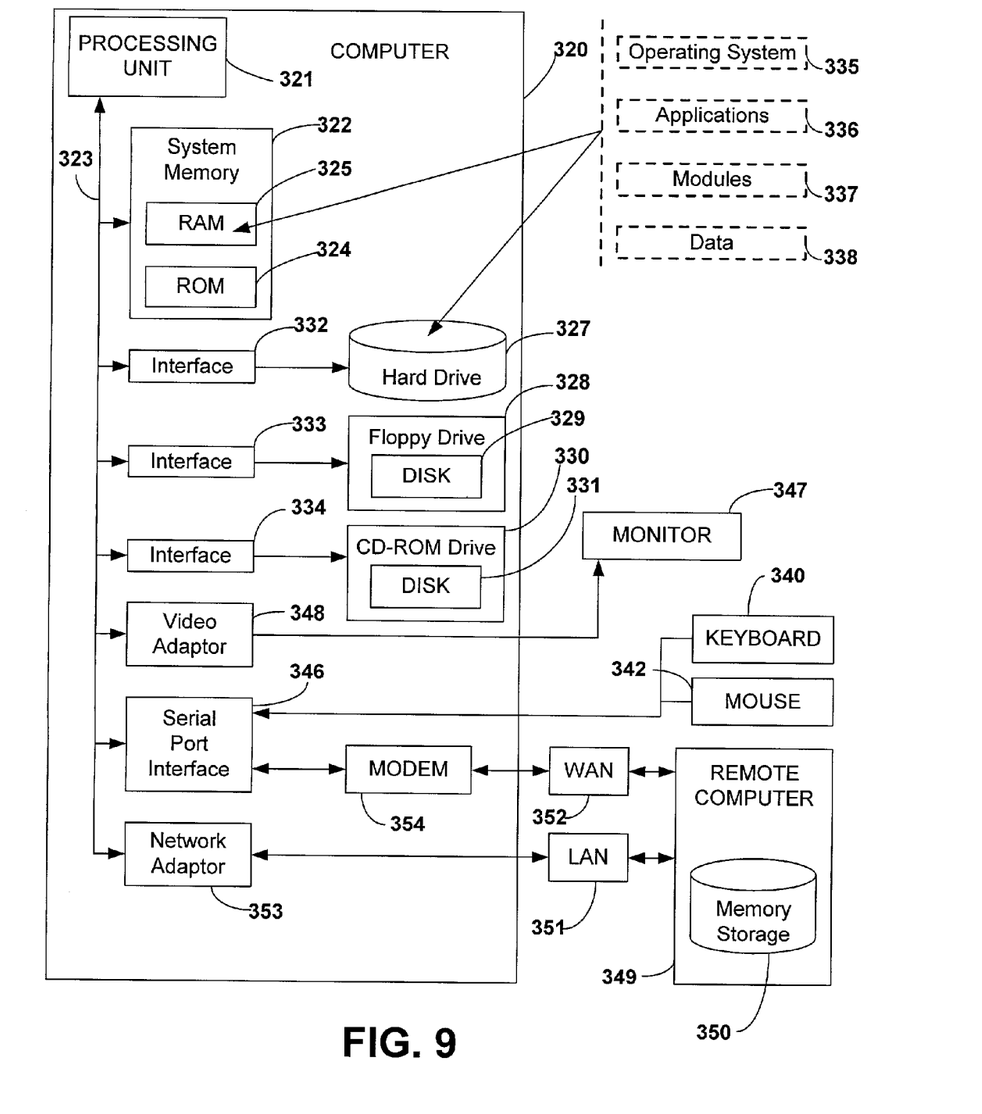
FIG. 9 is a schematic block diagram illustrating an exemplary operating environment in which one or more aspects of the invention may be implemented.

In order to provide a context for the various aspects of the invention, FIG. 9 and the following discussion are intended to provide a brief, general description of a suitable computing environment in which the various aspects of the present invention may be implemented. While the invention has been described above in the general context of software tools and computer-executable instructions of a computer program that runs on a computer and/or computers, those skilled in the art will recognize that the invention also may be implemented in combination with other program modules. Generally, program modules include routines, programs, components, data structures, etc. that perform particular tasks and/or implement particular abstract data types.

Moreover, those skilled in the art will appreciate that the inventive methods may be practiced with other computer system configurations, including single-processor or multiprocessor computer systems, minicomputers, mainframe computers, as well as personal computers, hand-held computing devices, microprocessor-based or programmable consumer electronics, and the like. The illustrated aspects of the invention may also be practiced in distributed computing environments where tasks are performed by remote processing devices that are linked through a communications network. However, some, if not all aspects of the invention can be practiced on stand-alone computers. In a distributed computing environment, program modules may be located in both local and remote memory storage devices.

With reference to FIG. 9, an exemplary environment for implementing various aspects of the invention includes a computer 320, including a processing unit 321, a system memory 322, and a system bus 323 that couples various system components including the system memory to the processing unit 321. The processing unit 321 may be any of various commercially available processors, including but not limited to Intel x86, Pentium®, and compatible microprocessors from Intel and others, including Cyrix, AMD and Nexgen; Alpha®, from Digital; MIPS®, from MIPS Technology, NEC, IDT, Siemens, and others; and the PowerPC®, from IBM and Motorola. Dual microprocessors and other multi-processor architectures also can be used as the processing unit 321.

The system bus 323 may be any of several types of bus structure including a memory bus or memory controller, a peripheral bus, and a local bus using any of a variety of conventional bus architectures such as PCI, VESA, Microchannel, ISA, and EISA, to name a few. The computer memory may include read only memory (ROM) 324 and random access memory (RAM) 325. A basic input/output system (BIOS), containing the basic routines that help to transfer information between elements within the computer 320, such as during start-up, is stored in ROM 324.

The computer 320 further includes a hard disk drive 327, a magnetic disk drive 328, e.g., to read from or write to a removable disk 329, and an optical disk drive 330, e.g., for reading a CD-ROM disk 331 or to read from or write to other optical media. The hard disk drive 327, magnetic disk drive 328, and optical disk drive 330 are connected to the system bus 323 by a hard disk drive interface 332, a magnetic disk drive interface 333, and an optical drive interface 334, respectively. The drives and their associated computer-readable media provide nonvolatile storage of data, data structures, computer-executable instructions, etc. for the computer 320, including for the storage of broadcast programming in a suitable digital format.

Although the description of computer-readable media above refers to a hard disk, a removable magnetic disk and a CD-ROM, it will be appreciated by those skilled in the art that other types of media which are readable by a computer, such as zip drives, magnetic cassettes, flash memory cards, digital video disks, Bernoulli cartridges, and the like, may also be used in the exemplary operating environment, and further that any such media may contain computer-executable instructions for performing the methods of the present invention.

A number of program modules may be stored in the drives and RAM 325, including an operating system 335, one or more application programs 336, other program modules 337, and program data 338. The operating system 335 in the illustrated computer is, for example, the "Microsoft Windows NT" operating system, although it is to be appreciated that the present invention may be implemented with other operating systems or combinations of operating systems, such as UNIX, LINUX, etc.

A user may enter commands and information into the computer 320 through a keyboard 340 and a pointing device, such as a mouse 342. Other input devices (not shown) may include a microphone, an IR remote control, a joystick, a game pad, a satellite dish, a scanner, or the like. These and other input devices are often connected to the processing unit 321 through a serial port interface 346 that is coupled to the system bus 323, but may be connected by other interfaces, such as a parallel port, a game port, a universal serial bus ("USB"), an IR interface, etc. A monitor 347 or other type of display device is also connected to the system bus 323 via an interface, such as a video adapter 348. In addition to the monitor, a computer typically includes other peripheral output devices (not shown), such as speakers, printers etc.

The computer 320 may operate in a networked environment using logical connections to one or more remote computers, such as a remote computer(s) 349. The remote computer(s) 349 may be a workstation, a server computer, a router, a personal computer, microprocessor based entertainment appliance (e.g., a WebTV client system), a peer device or other common network node, and typically includes many or all of the elements described relative to the computer 320, although, for purposes of brevity, only a memory storage device 350 is illustrated. The logical connections depicted include a local area network (LAN) 351 and a wide area network (WAN) 352. Such networking environments are commonplace in offices, enterprise-wide computer networks, intranets and the Internet.

When used in a LAN networking environment, the computer 320 is connected to the local network 351 through a network interface or adapter 353. When used in a WAN networking environment, the computer 320 typically includes a modem 354, or is connected to a communications server on the LAN, or has other means for establishing communications over the WAN 352, such as the Internet. The modem 354, which may be internal or external, is connected to the system bus 323 via the serial port interface 346 (e.g., for communications over POTS). The modem 354, alternatively, may be connected to the system bus 323 via the network interface or adapter 353 (e.g., for communication over DSL, cable, satellite, etc.). In a networked environment, program modules depicted relative to the computer 320, or portions thereof, may be stored in the remote memory storage device 350. It will be appreciated that the network connections shown are exemplary and other means of establishing a communications link between the computers may be used.

Although the invention has been shown and described with respect to certain implementations, it will be appreciated that equivalent alterations and modifications will occur to others skilled in the art upon the reading and understanding of this specification and the annexed drawings. In particular regard to the various functions performed by the above described components (assemblies, devices, circuits, systems, etc.), the terms (including a reference to a "means") used to describe such components are intended to correspond, unless otherwise indicated, to any component which performs the specified function of the described component (i.e., that is functionally equivalent), even though not structurally equivalent to the disclosed structure, which performs the function in the herein illustrated exemplary applications and implementations of the invention.

In addition, while a particular feature of the invention may have been disclosed with respect to only one of several aspects or implementations of the invention, such a feature may be combined with one or more other features of the other implementations as may be desired and advantageous for any given or particular application. Furthermore, to the extent that the terms "includes", "including", "has", "having", and variants thereof are used in either the detailed description or the claims, these terms are intended to be inclusive in a manner similar to the term "comprising" and its variants.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims.

What is claimed is:

1. A software on a computer system tool for installing a software component on a server computer system, comprising:
   a user interface component that renders a plurality of setup prompts to a user, suppresses at least one of the plurality of setup prompts and obtains a user command;
   a setup component that senses an attribute of a registry of the server computer system, which attribute is associated with a low functionality suite package and a higher functionality suite package, the setup component selectively provides at least one of a standard setup prompt, an additional setup prompt and a substitute setup prompt, and selectively suppresses at least one setup prompt according to the attribute, and selectively installs the software component on the server computer system according to the user command; and
   a prompt counter that tracks a number of setup prompts provided to the user until a maximum prompt value has been exceeded, once the maximum prompt value has been reached, a setup operation is performed according to the user command obtained from the setup plurality of prompts.

2. The software tool of claim 1, the setup component selectively suppresses at least one setup prompt from the user interface component if the attribute indicates the at least one setup prompt is unnecessary.

3. The software tool of claim 2, the at least one setup prompt comprises a selection between at least two setup parameters, and the setup component selects one of the at least two setup parameters according to the attribute.

4. The software tool of claim 3, the setup component selectively installs the software component on the computer system using the selected one of the at least two setup parameters.

5. The software tool of claim 4, the attribute comprises data stored in the computer system.

6. The software tool of claim 5, the data comprises a registry key.

7. The software tool of claim 6, the software component comprises one of an operating system and an application.

8. The software tool of claim 7, the software component comprises a plurality of program components, and the setup component-selectively installs at least one of the plurality of program components according to the attribute.

9. The software tool of claim 1, the at least one setup prompt comprises a selection between at least two setup parameters, and the setup component selects one of the at least two setup parameters according to the attribute.

10. The software tool of claim 9, the setup component selectively installs the software component on the computer system using the selected one of the at least two setup parameters.

11. The software tool of claim 10, the attribute comprises a registry key.

12. The software tool of claim 11, the software component comprises one of an operating system and an application.

13. The software tool of claim 12, the software component comprises a plurality of program components, and the setup component selectively installs at least one of the plurality of program components according to the attribute.

14. A software setup on a computer system tool for performing a setup operation in a server computer system, comprising:
    a setup component that senses an attribute of a registry of the server computer system, which attribute is associated with a low functionality suite package and a higher functionality suite package, the setup component selectively provides at least one of a standard setup prompt, an additional setup prompt and a substitute setup prompt, and selectively suppresses at least one setup prompt according to the attribute;
    a user interface component that renders a plurality of setup prompts to a user, suppresses at least one of the plurality of setup prompts and obtains at least one setup parameter; and
    a prompt counter that tracks a number of setup prompts provided to the user until a maximum prompt value has been exceeded, once the maximum prompt value has been reached, the setup operation is performed according to the at least one setup parameter obtained from the plurality of setup prompts.

15. The software setup tool of claim 14, the setup component further selectively performs at least one setup operation according to the at least one setup parameter and the attribute.

16. The software setup tool of claim 15, the attribute comprises a registry key.

17. The software setup tool of claim 16, the setup component further selectively suppresses at least one setup prompt from the user interface component if the attribute indicates the at least one setup prompt is unnecessary.

18. The software setup tool of claim 17, the at least one setup prompt comprises a selection between at least two setup parameters, and the setup component selects one of the at least two setup parameters according to the attribute.

19. The software setup tool of claim 18, the setup component selectively installs a software component on the computer system using the selected one of the at least two setup parameters.

20. A method of performing a setup operation in a server computer system, comprising:
    sensing an attribute of a registry of the server computer system, which attribute is associated with a low functionality suite package and a higher functionality suite package;
    selectively providing at least one of a standard setup prompt, an additional setup prompt and a substitute setup prompt according to the attribute;
    selectively suppressing at least one setup prompt according to the attribute;
    rendering a plurality of setup prompts to a user;
    obtaining at least one setup parameter;
    tracking a number of setup prompts provided to the user until a maximum prompt value has been exceeded; and
    performing at least one setup operation according to the at least one setup parameter obtained from the plurality of setup prompts once the maximum prompt value has been reached.

21. The method of claim 20, the attribute comprises a registry key.

22. The method of claim 20, the at least one setup prompt comprises a selection between at least two setup parameters and the act of suppressing at least one setup prompt from the user interface component comprises selecting one of the at least two setup parameters according to the attribute.

23. The method of claim 22, selectively performing at least one setup operation comprises selectively installing a software component on the computer system using the selected one of the at least two setup parameters.

24. A computer-readable medium comprising computer-executable instructions for performing a setup operation of a server computer system, the computer-readable medium comprising computer-executable instructions for:
    sensing an attribute of a registry of the server computer system, which attribute is associated with a low functionality suite package and a higher functionality suite package;
    selectively providing at least one of a standard setup prompt, an additional setup prompt and a substitute setup prompt according to the attribute;
    selectively suppressing at least one setup prompt according to the attribute;
    rendering a plurality of setup prompts to a user;
    obtaining at least one setup parameter;
    tracking a number of setup prompts provided to the user until a maximum prompt value has been exceeded; and
    performing at least one setup operation according to the at least one setup parameter obtained from the plurality of setup prompts once the maximum prompt value has been reached.

25. The computer-readable medium of claim 24, further comprising computer-executable instructions for selectively performing at least one setup operation according to the at least one setup parameter.

26. The computer-readable medium of claim 25, the computer executable instructions for sensing an attribute associated with the computer system comprise computer executable instructions for sensing a registry key.

27. The computer-readable medium of claim 24, the at least one setup prompt comprises a selection between at least two setup parameters, and the computer executable instructions for suppressing at least one setup prompt from the user interface component comprises computer executable instructions for selecting one of the at least two setup parameters according to the attribute.

28. The computer-readable medium of claim 27, the computer executable instructions for selectively performing at least one setup operation comprise computer executable instructions for selectively installing a software component on the computer system using the selected one of the at least two setup parameters.

29. A software tool on a computer system for performing a setup operation in a server computer system, comprising:
    means for sensing an attribute of a registry of the server computer system, which attribute is associated with a low functionality suite package and a higher functionality suite package;
    means for selectively providing at least one of a standard setup prompt, an additional setup prompt and a substitute setup prompt according to the attribute;
    means for selectively suppressing at least one setup prompt according to the attribute;
    means for rendering a plurality of setup prompts to a user;
    means for obtaining at least one setup parameter;
    means for tracking a number of setup prompts provided to the user until a maximum prompt value has been exceeded; and
    means for performing the setup operation according to the at least one setup parameter obtained from the plurality of setup prompts, once the maximum prompt value has been reached.

30. The software tool of claim 29, the attribute comprises a registry key.

31. A computer system that facilitates an installation of a server operating system, comprising:
    a setup component that senses an attribute of a registry associated with the server operating system, and in accordance with the attribute, selectively provides at least one of standard prompts for loading a standard functionality installation of server components and special prompts for loading a special lower functionality installation of server components, and selectively suppresses at least one setup prompt in accordance with the attribute;
    a user interface component that renders at least one of the standard prompts and the special prompts, suppresses at least one of the standard prompts, and receives at least one setup parameter; and
    a prompt counter that tracks a number of setup prompts provided to a user until a maximum prompt value has been exceeded, once the maximum prompt value has been reached, a setup operation is performed according to the at least one setup parameter obtained from the at least one of the standard prompts and the special prompts.

32. The computer system of claim 31, the standard functionality installation includes the rendering of a standard prompt that is a licensing page, which licensing page is not rendered during the special lower functionality installation.

33. The computer system of claim 31, the server operating system is installed in a per server mode when the attribute indicates the special lower functionality installation of server components.

34. The computer system of claim 33, the per server mode invokes a fixed number of client user licenses.

35. The computer system of claim 31, the standard functionality installation includes the rendering of a standard prompt that is a licensing page.

36. The system of claim 31, only the special lower functionality installation requires the rendering of a workgroup/domain page.

37. The computer system of claim 31, the special lower functionality installation includes installing the server operating system in accordance with a default workgroup.

38. The computer system of claim 31, the special prompts are included in the standard prompts.

39. The computer system of claim 31, the special prompts are included in the standard prompts, such that some of the standard prompts are by-passed during the special lower functionality installation in accordance with the attribute.

* * * * *